(12) United States Patent
Ellis-Brown et al.

(10) Patent No.: US 9,411,213 B2
(45) Date of Patent: Aug. 9, 2016

(54) CASES FOR PORTABLE ELECTRONIC DEVICES

(71) Applicant: Heylo Limited, West Sussex (GB)

(72) Inventors: James Ellis-Brown, Burgess Hill (GB); Tom Constant, West Sussex (GB)

(73) Assignee: Heylo Limited (GB)

( * ) Notice: Subject to any disclaimer, the term of this patent is extended or adjusted under 35 U.S.C. 154(b) by 0 days.

(21) Appl. No.: 14/416,823

(22) PCT Filed: Sep. 12, 2013

(86) PCT No.: PCT/GB2013/052380
§ 371 (c)(1),
(2) Date: Jan. 23, 2015

(87) PCT Pub. No.: WO2014/020362
PCT Pub. Date: Feb. 6, 2014

(65) Prior Publication Data
US 2015/0205184 A1    Jul. 23, 2015

(30) Foreign Application Priority Data

Jul. 31, 2012 (GB) .................................... 1213556.2
Sep. 12, 2012 (GB) .................................... 1216280.6

(51) Int. Cl.
*G03B 15/06* (2006.01)
*G03B 15/05* (2006.01)
(Continued)

(52) U.S. Cl.
CPC ................ *G03B 15/06* (2013.01); *A45C 15/06* (2013.01); *G02B 5/0205* (2013.01); *G03B 15/05* (2013.01); G06F 1/1628 (2013.01); *G06F 1/1632* (2013.01); *H04B 1/3888* (2013.01); *H04M 1/0283* (2013.01); *H04M 1/04* (2013.01); *A45C 2011/001* (2013.01); *A45C 2011/002* (2013.01); *A45C 2011/003* (2013.01); *A45F 2200/0516* (2013.01); *G06F 2200/1633* (2013.01)

(58) Field of Classification Search
CPC ...... G03B 15/06; G03B 15/05; G02B 5/0205; A45C 15/06; A45C 2011/003; A45C 2011/001; A45C 2011/002; G06F 1/1632; G06F 1/1628; G06F 2200/1633; H04M 1/04; H04M 1/0283; H04B 1/3888; A45F 2200/0516
See application file for complete search history.

(56) References Cited

U.S. PATENT DOCUMENTS 8,395,894 B2 * 3/2013 Richardson et al. ..... 361/679.55
8,509,864 B1 * 8/2013 Diebel .................. G03B 17/02
                                                    361/679.32

(Continued)

FOREIGN PATENT DOCUMENTS

EP    2200261 A1    6/2010
EP    2228974 A2    9/2010
(Continued)

OTHER PUBLICATIONS

British search report corresponding to GB1216280.6 dated Nov. 2, 2012, 2 pages.

*Primary Examiner* — Brandon Miller
(74) *Attorney, Agent, or Firm* — Tarolli, Sundheim, Covell & Tummino LLP

(57) ABSTRACT

A case (10) for a portable electronic device (especially for an iPhone (100) and the like) comprises a shell (12), a diffuser (40) mounted within the shell (12), and an optional transparent insert (150) with custom graphics located between a front side (14) of the shell and the diffuser (40). The diffuser (40) comprises a Perspex panel having an etched portion (44) from which light escapes. The diffuser (40) may be slid between a position in which a flash (102) of the device is unobstructed, for normal photographic use, and a position in which light (200) from the flash (102) is received on a first surface (41) of the diffuser (40), whereby it is re-directed internally before being emitted from the etched portion (44) on the opposite, second surface (43) to provide even and bright illumination of that second surface.

19 Claims, 13 Drawing Sheets

(51) Int. Cl.
*G02B 5/02* (2006.01)
*A45C 15/06* (2006.01)
*G06F 1/16* (2006.01)
*H04M 1/04* (2006.01)
*H04M 1/02* (2006.01)
*A45C 11/00* (2006.01)
*H04B 1/38* (2015.01)
*H04B 1/3888* (2015.01)

(56) References Cited

U.S. PATENT DOCUMENTS

| | | | | |
|---|---|---|---|---|
| 8,676,281 | B1 * | 3/2014 | Caulder et al. | 455/575.8 |
| 8,763,802 | B2 * | 7/2014 | Ellis-Brown | 206/320 |
| 8,933,813 | B2 * | 1/2015 | Small | G02B 6/0008 |
| | | | | 340/815.45 |
| 2009/0027874 | A1 | 1/2009 | Chang | |
| 2009/0231248 | A1 | 9/2009 | Dorff et al. | |
| 2012/0052929 | A1 | 3/2012 | Thammasouk et al. | |
| 2013/0069499 | A1 * | 3/2013 | Modrell | G06F 1/1656 |
| | | | | 312/223.1 |

FOREIGN PATENT DOCUMENTS

| | | |
|---|---|---|
| EP | 2484679 A | 4/2012 |
| GB | 2484679 | 4/2012 |
| WO | 02098006 A1 | 12/2002 |
| WO | 2011090536 A1 | 7/2011 |

* cited by examiner

CASES FOR PORTABLE ELECTRONIC DEVICES

FIELD OF THE INVENTION

The invention relates to cases for portable electronic devices, and in particular to cases that are able both to perform a protective function and to enable the visual appearance of the case (and therefore the portable electronic device) to be changed with ease. More particularly, the invention relates to illuminating an image contained in the case by means of a light source external to the case.

BACKGROUND TO THE INVENTION

Protective cases for portable electronic devices are well known and have become almost ubiquitous in the market for certain mobile telephones, such as the iPhone™.

It is also known to provide exchangeable outer panels to adapt the external appearance of portable electronic devices, such as laptops, netbooks, MP3 players and mobile phones.

The concepts of a protective case and illuminated exchangeable graphics have been combined in, for example, the applicant's own prior application GB2484679, in which the principal light source for the illumination of the case is an electroluminescent (EL) panel in the case.

It is an objective of the present invention to provide a case having a striking illuminated visual appearance that can readily be altered. It would be preferable, but not essential, for the case additionally to perform a protective function.

It is another objective of the present invention to allow the user to customise their portable electronic device and use the illuminated case as a fashion accessory.

A further objective is to exploit the presence of light sources, such as camera flash units, on many portable electronic devices to act as a light source in the provision of an illuminated case.

The illuminated case could also be used as a safety feature or beacon to illuminate, attract attention or be used as a warning device, including Morse code. It could be furthermore be used as an advertisement accessory.

SUMMARY OF THE INVENTION

According to a first aspect of the invention, there is provided a case for a portable electronic device, the case comprising:

a shell defining an interior volume dimensioned so as to snugly accommodate a particular portable electronic device, wherein at least a portion of the shell is translucent or transparent; and a diffuser, visible through said translucent or transparent portion of the shell and configured to diffuse light incident on a first surface of the diffuser for emission from a second surface of the diffuser facing the translucent or transparent portion.

Such a case enables an illuminated display to be provided for aesthetic and/or functional benefit and to meet the objectives set out above. There is no need for a light source to be integrated into the case, or for the case to include a power source or power connections. The case can accordingly be made smaller, lighter and more inexpensively. In preferred embodiments, the translucent or transparent portion of the shell comprises a main window on a front side of the shell and, optionally, at least one edge window disposed along an edge of the shell. With the latter arrangement, light emitted by the diffuser will be visible through the edge window(s), even if the main window is obscured, for example by being placed face-down on a surface.

The first surface of the diffuser is typically opposite to the second surface and faces the interior volume. Accordingly, the incident light is transmitted through the diffuser from the side facing the interior volume to the side opposite, facing the translucent or transparent portion of the shell. This arrangement typically provides the most straightforward light path through the diffuser from a light source in the encased electronic device. In alternative embodiments, the incident light may instead or as well be transmitted through the diffuser from a lateral side of the diffuser to the second surface.

The diffuser element may comprise a panel of light-transmissive material received in a cavity in the shell. In some embodiments, the diffuser could be integral with the shell, underlying or even forming the translucent or transparent portion of the shell.

The case may comprise a reflective layer disposed on the first surface of the diffuser. In certain embodiments, the reflective layer acts in conjunction with the diffuser panel, re-directing any light that might otherwise have exited the diffuser via the first surface so as to instead be emitted from the second surface. In other embodiments, the reflective layer may itself comprise the diffuser, acting to simultaneously re-direct and diffuse light incident on the first surface (which may be ambient light) to be emitted from the second surface, which in this case is coincident with the first surface. In either instance, this increases the luminosity of the light transmitted through the translucent or transparent portion of the shell. In order to further increase the luminosity, an additional reflective layer may be disposed around the sides of the diffuser.

The diffuser may, when comprising a panel of light-transmissive material, include an etched portion in its second surface. Light incident on the etched portion from within the panel that might otherwise have been totally internally reflected within the panel might be affected by the etched portion and so be re-directed to be emitted only from the etched portion. In this manner, decorative illuminating effects can be achieved through the etching of graphical images on to the second surface of the diffuser.

Preferably, the diffuser includes at least one lens element, configured to re-direct light incident on the lens element within the diffuser. The lens element may comprise an indent cut into the first surface of the diffuser. Alternatively or additionally, the lens element may comprise a reflective prism internally disposed in the diffuser from the second surface. Such lens elements are able to re-direct the light that is incident on them, for example to be transmitted more laterally within the diffuser rather than being transmitted directly from the first surface through the second surface. The objective of the lens element(s) is therefore to spread the light more evenly across the diffuser to provide a more even illumination effect.

The lens element is typically positioned so as to be in registration with a light source on the portable electronic device when received in the interior volume. With this arrangement, there is no need for a stand-alone light source in the case itself; instead, the light source on the portable electronic device can be used to drive the illumination of the case.

Portable electronic devices often include a display. In order for such a display to be visible, and, where the display is interactive, for a user to be able to interact with the display, the shell includes a window through which the display on the portable electronic device is visible when received in the interior volume.

In a preferred embodiment, the case further comprises a pocket interposed between the diffuser and the transparent or translucent portion of the shell for receiving a transparent graphic. With a transparent graphic inserted into the pocket, light emitted by the diffuser will pass through transparent portions of the graphic, be blocked by opaque portions, and be colour-filtered by coloured portions, thus providing striking visual graphics. Preferably, the pocket includes a slot at one end through which transparent graphics can be slid, so as to enable their interchange. In this way, a user can readily change the visual appearance of their portable electronic device by simply exchanging one transparent graphic for another.

Typically, at least the translucent or transparent portion of the shell is formed of clear polycarbonate. This material is tough and strong, to enable the case to perform a protective duty, yet also has minimal influence on the transmittal of light therethrough, ensuring a crisp and clear illuminated display. Whereas the entire shell could be formed from such polycarbonate, it might be beneficial for the sides of the shell to be formed of rubber, bonded to the polycarbonate portion, because rubber sides would be better able to absorb impacts and protect the portable electronic device within, yet would not be suited to transmittal of light.

The case might typically be configured to receive a portable electronic device that includes a camera flash. As well as cameras, many mobile telephones and other portable electronic devices include a camera and an associated flash. For example, the iPhone™ includes a camera and an LED flash on the rear of the phone (opposite to the touch screen display).

Where the diffuser comprises a panel of light transmissive material and the case is configured to receive a portable electronic device that includes a camera flash, the diffuser is preferably slidable within the cavity between a position in which light emitted by the flash is incident on the first surface of the diffuser and a position in which the diffuser does not interfere with light from the flash. Thus, the functionality of the camera and flash will not be affected by the presence of the diffuser in the case unless the diffuser is specifically moved into the position in which the light emitted by the flash would be incident on the diffuser and so be diffused thereby.

The diffuser typically includes a slider accessible through a slot in a side of the shell for sliding the diffuser between said positions. The slider may be in the form of a tab protruding through the slot, and possibly include a button attached to the tab for ease of manipulation.

The case may, in certain embodiments, further comprise a light source mounted to the shell for emitting light incident on the first surface of the diffuser. This light source may be in addition to the light source of the portable electronic device (where present) so as to supplement that light and enhance illumination or it may be instead of, for example for use with devices not having an integral light source.

The light source mounted to the shell may be active and comprise one or more LEDs or micro-LEDs mounted directly to the interior of the shell. These may be powered by a battery in the case or may be connected to the battery of the portable electronic device, or to an external power source.

Alternatively, the light source mounted to the shell may be passive, for example comprising a reflective layer for re-directing ambient light incident on the reflective layer, such as a reflective painted surface, or the passive light source may comprise a luminous painted surface.

BRIEF DESCRIPTION OF THE DRAWINGS

The invention will be described, by way of example, with reference to the accompanying drawings, in which.

DETAILED DESCRIPTION

Figure 1:
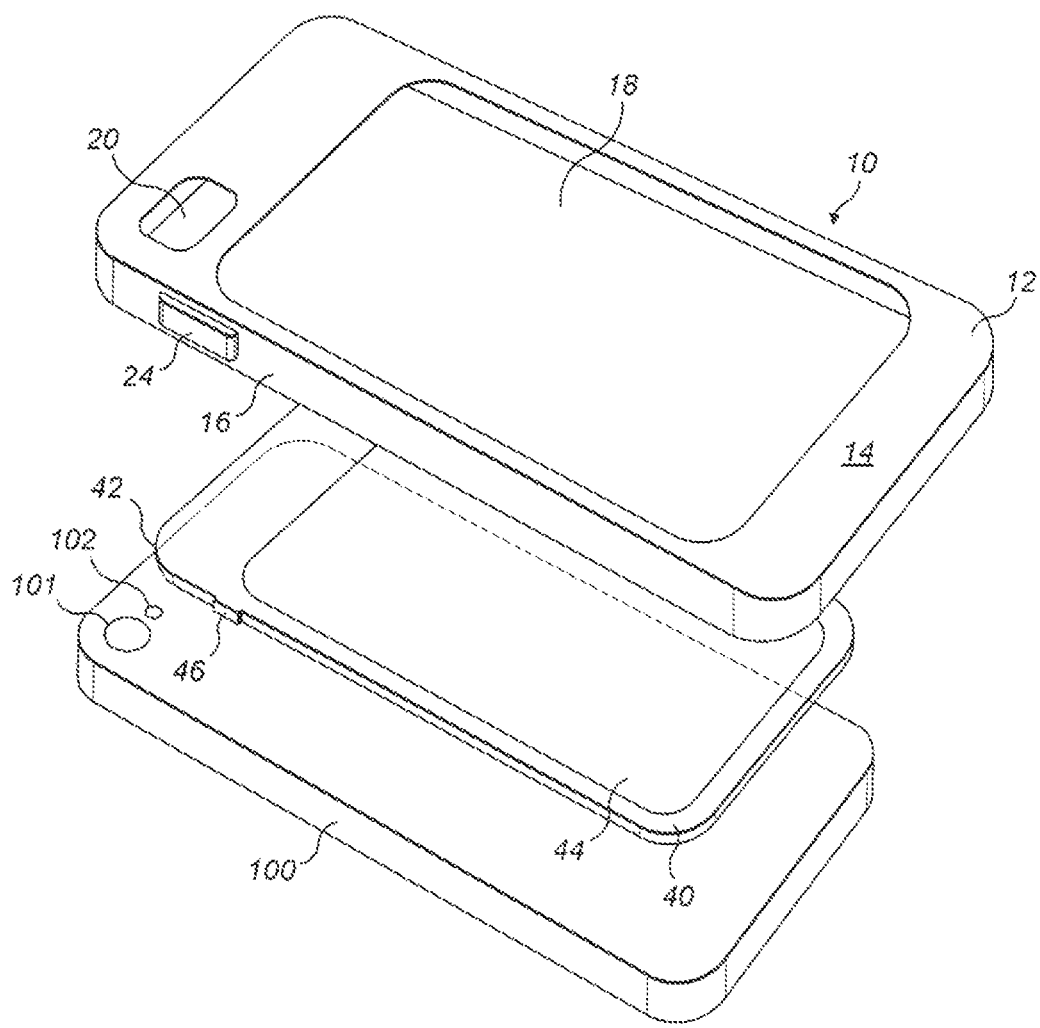
FIG. 1 is an exploded perspective view from above of a case in accordance with one aspect of the invention, an exemplary diffuser, and a portable electronic device (here, a mobile phone) for receipt in the case.
Figure 2:
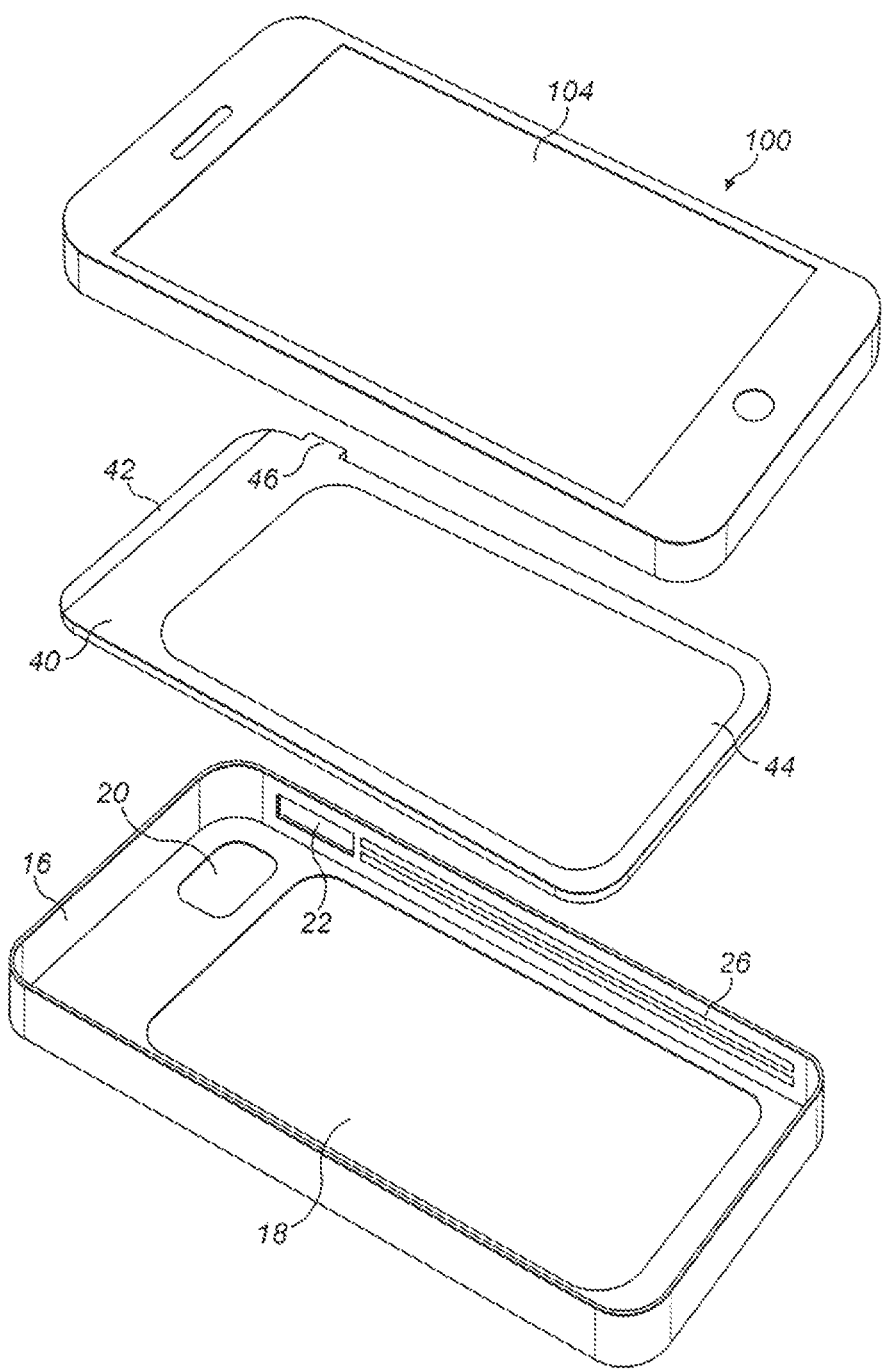
FIG. 2 corresponds to FIG. 1, but from below.

In the following description, reference will be made to an inventive case adapted to receive a mobile telephone, particularly the Apple™ iPhone™ 4S, but it will be appreciated that the invention is equally applicable to other brands of mobile phone as well as other portable electronic devices, such as the Apple™ iPod™, Apple™ iPad™, other tablet devices, laptops, netbooks, palmtops, PDAs, MP3 players, etc.

A case 10 comprises a shell 12 having a front side 14 and edges 16 projecting therefrom, which together define an interior volume or cavity within which to receive an iPhone™ 4S 100. There is a main window 18 through a central portion of the front side 14, and a smaller secondary window 20 through a top lateral portion of the front side 14. The front side 14 is flat and typically formed of a polycarbonate material. The edges 16 may also be formed of the same polycarbonate material, thereby forming a unitary moulded shell 12.

Alternatively, the sides 16 may be formed of rubber, which may be opaque, but which adds no significant bulking along the outside edges or rim of the iPhone 100. The polycarbonate front side 14 and solid opaque rubber edges 16 are bonded together as one smooth piece. The shell 12 is thus made as a unitary piece and does not have interlocking parts as some cases do. This will preserve the feel of the iPhone within. The rubber edges 16 act as a grip as well as protecting the iPhone's sides and notably also protect the iPhone's signal strength from short circuiting and interference which Apple's 'Bumper' also provides. It will be understood, however, that alternative implementations of the shell 12 are possible, and that it might be appropriate to form the shell from two separable halves, for example, for ease of insertion/removal of the iPhone 100. The main and secondary windows 18, 20 may be open apertures through the shell material, or may include clear panels mounted to or integral with the front side 14 of the shell 12.

When the iPhone 100 is received in the interior volume of the shell, the camera lens 101 and associated flash 102 are in registration with the secondary window 20 so that they are not covered and can still operate while the case 10 is attached.

Note that the front side 14 of the shell (and therefore of the case 10) as defined herein may not necessarily correspond to what is conventionally considered to be the front side of the associated portable electronic device. In the specific example of the case 10 adapted for the iPhone 4S 100, for example, the front side of the iPhone might be thought of as the side having the touch screen display 104. Here, however, we define the front side of the iPhone 100 as being the side with the camera lens 101 and adjacent flash 102. When received in the case 10, the touch screen display 104 of the iPhone 100 is accessible and visible through an aperture 28 on the back side of the shell 12.

The case 10 will include features to enable operation of the controls of the iPhone 100 within. For example, the power control at the top of the iPhone™ may be accessed via a button (not shown) or through an aperture in the top edge of the shell 12. There would also be holes (not shown) for the headphone jack, power connection, mute switch, etc.

Of course, where the shell 12 is adapted to receive a different portable electronic device, the size and shape of the shell and the number, form and location of the buttons and/or holes will be different and adapted to that particular device.

Figure 5:
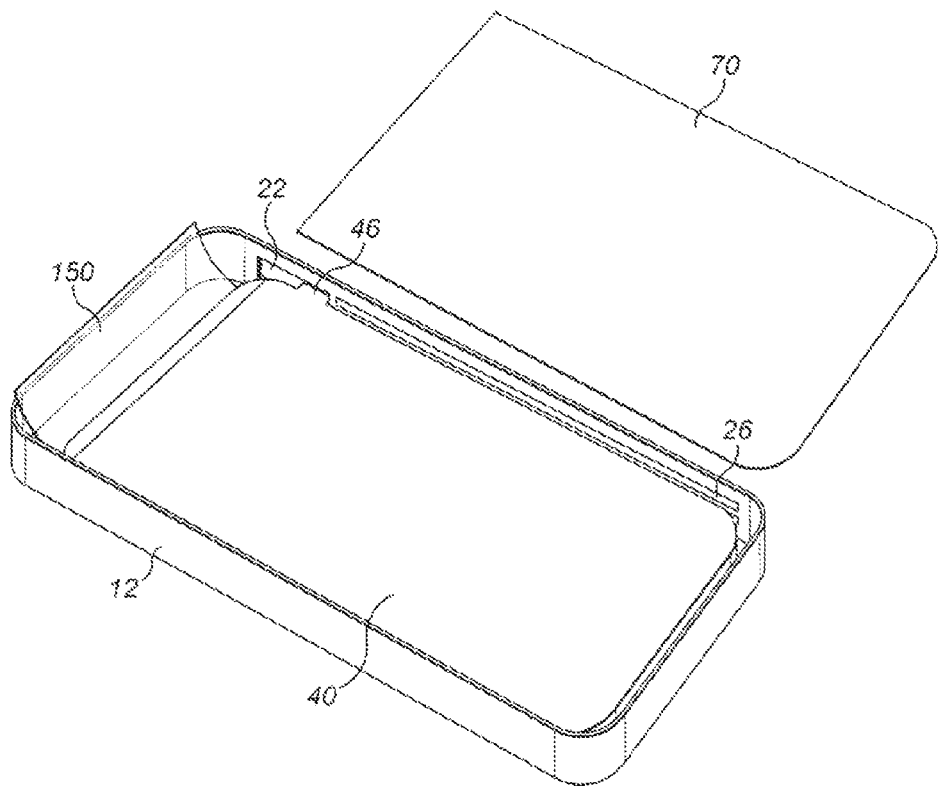
FIG. 5 shows the case and insert of FIG. 4 in a partially assembled state, with a part of the case removed and without the portable electronic device.

A diffuser 40 is received in the interior volume defined by the shell 12 between the front side of the iPhone 100 and the front side 14 of the shell, within parallel guide rails 26 (see FIG. 5 in particular). The diffuser 40 is typically a flat panel having chamfered edges 42 and an etched area 44 extending across a large portion of the front surface thereof. On one side edge of the diffuser 40, there is a projecting tab 46. The tab 46 is received in a slotted hole 22 through an edge of the shell 12. A slider button 24 is secured to the tab 22 on the outside of the shell 12 for sliding the tab 46 within the slot 22, thereby sliding the diffuser between a first position, in which light emitted by the flash 102 is incident on a back surface of the diffuser 40 for illuminating the case 10, and a position in which, for photographic purposes, the diffuser 40 does not interfere with light from the flash 102.

Note that other arrangements could be provided instead for sliding the diffuser 40 between the positions. For example, the diffuser 40 could include an indentation into which a projection from the slider button 24 is received.

Figure 22B:
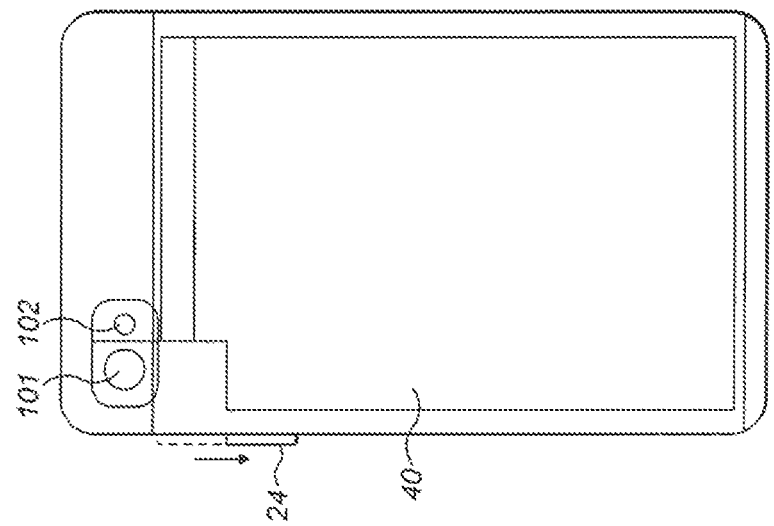
FIG. 22B corresponds to FIG. 22A, but showing the diffuser in a position in which the flash is exposed for conventional operation of the associated camera.
Figure 22A:
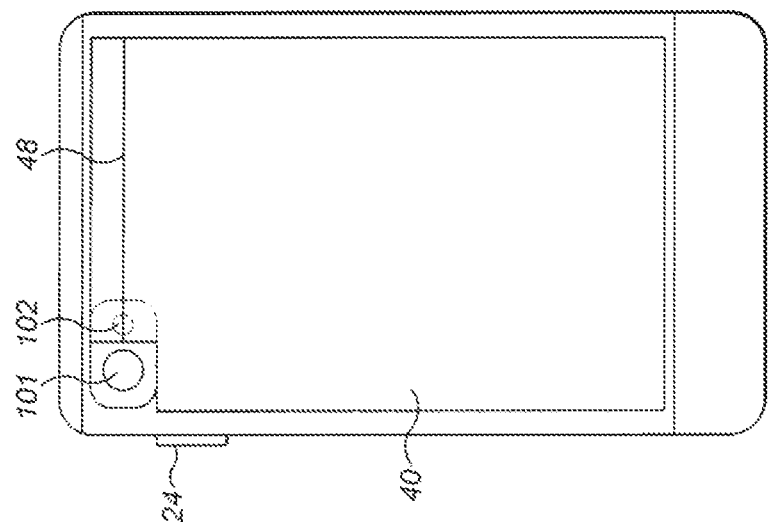
FIG. 22A is a front elevation of an exemplary case and diffuser as suited for an iPhone™ 4S, with the diffuser in a position blocking the flash and hence re-directing light from the flash through the diffuser.
Figure 23:
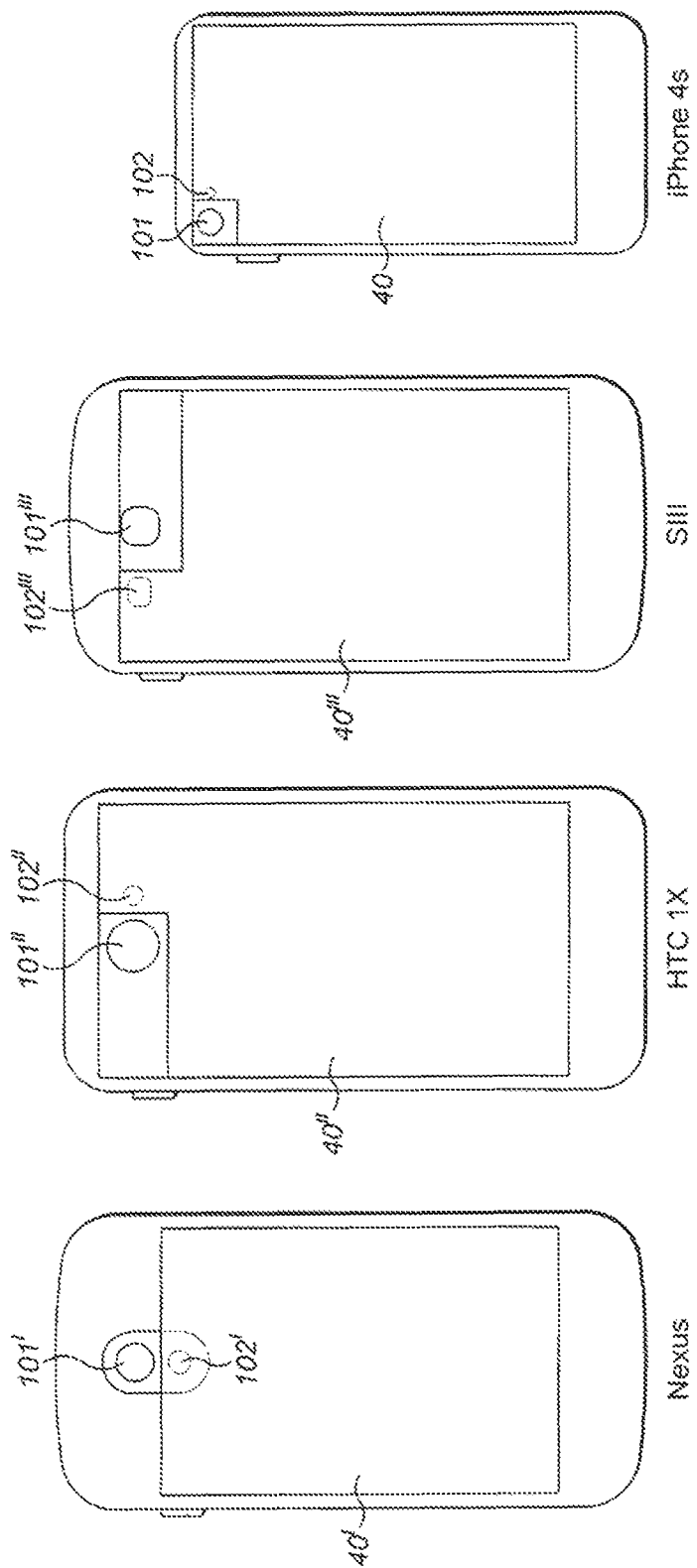
FIG. 23 shows alternative diffusers for use with some other current mobile phone designs.

As shown in FIGS. 22 and 23, the diffuser 40 may be shaped so that the lens 101 associated with the flash 102 is never obscured by the diffuser 40, no matter what position it is in. FIG. 23 shows alternative implementations of diffusers, 40', 40", 40''' suitable for use with the Google™ Nexus™, HTC™ 1X™ and Samsung™ SIII™ phones, respectively having lenses 101', 101" and 101''' and flashes 102', 102" and 102''', in comparison to the iPhone 4S.

Figure 3:
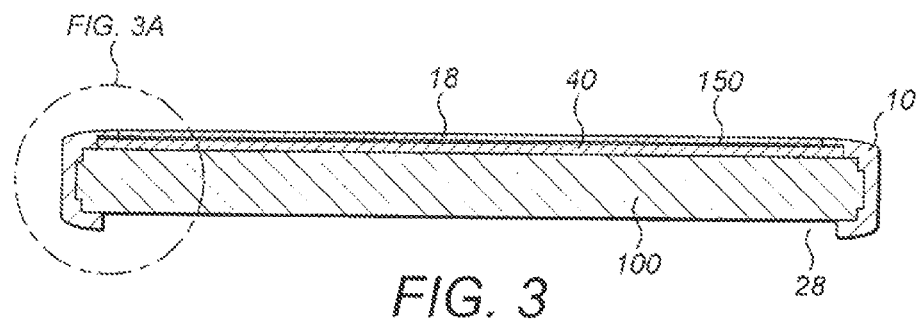
FIG. 3 is a cross-sectional view through an assembled case and diffuser, enclosing a portable electronic device (mobile phone)
Figure 3A:
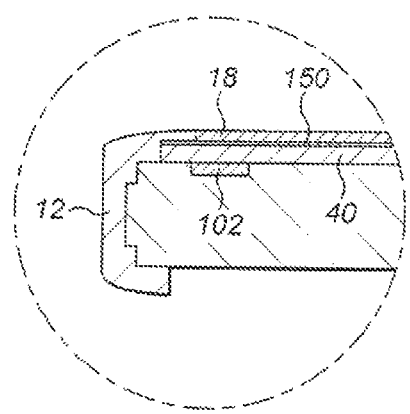
FIG. 3A is a detail view of an end portion of the case of FIG. 3, showing the phone's flash.
Figure 3B:
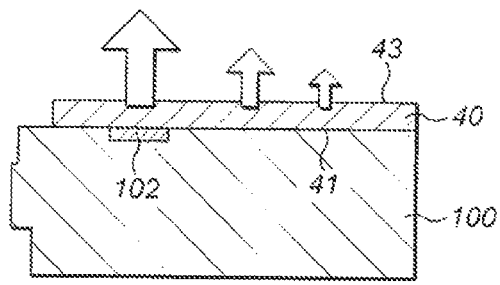
FIG. 3B corresponds to FIG. 3A, illustrating transmission of light from the flash through the diffuser.
Figure 3C:
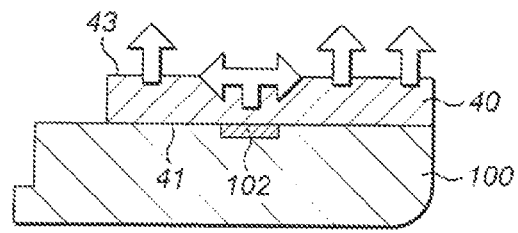
FIG. 3C corresponds to FIG. 3B, showing re-direction of the light within the diffuser.
Figure 4:
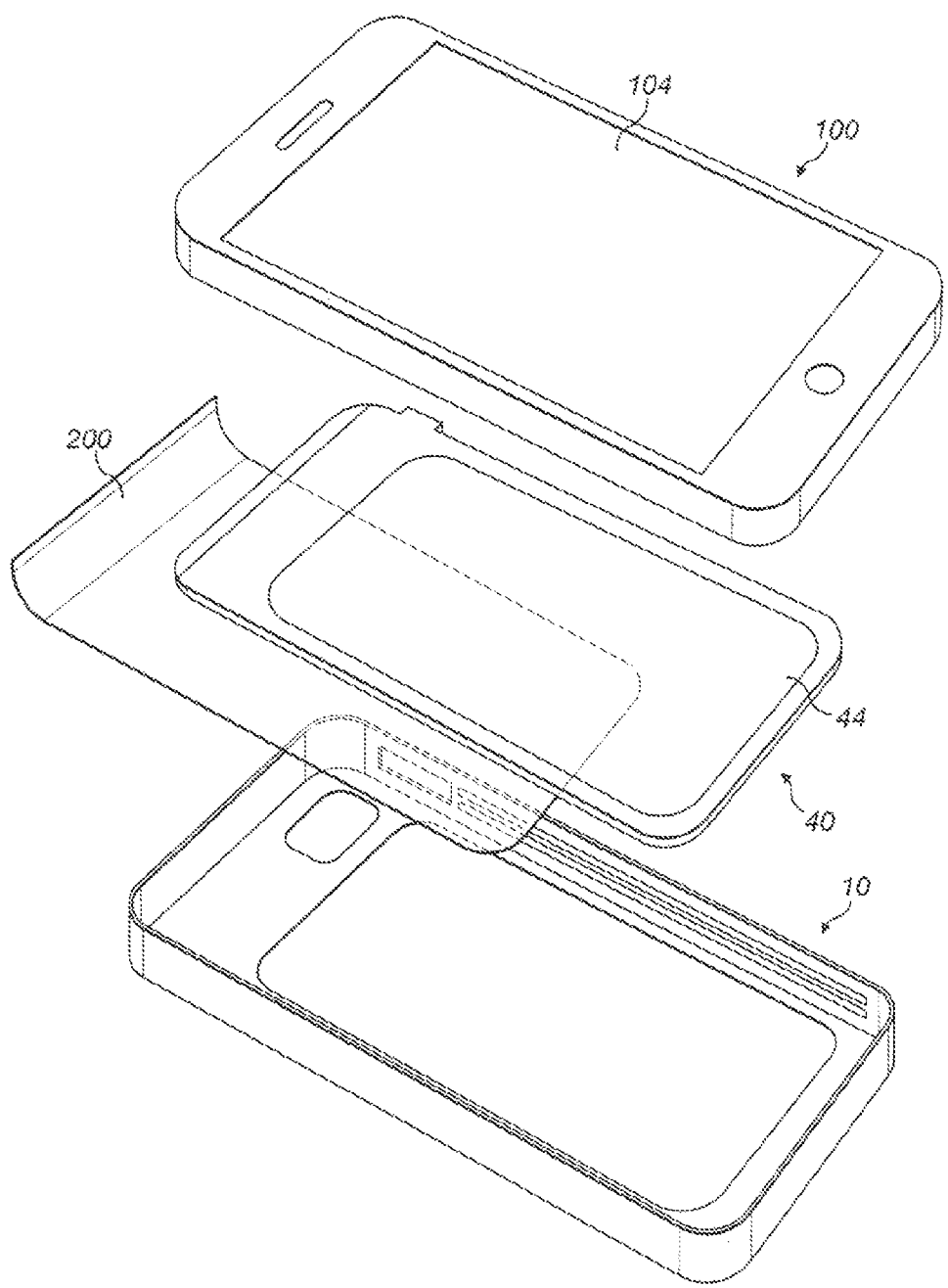
FIG. 4 corresponds to FIG. 2, but includes an optional transparency insert.

The purpose of the diffuser 40 is, as shown schematically in FIGS. 3-3C, to disperse light emitted from the flash 102 as evenly as possible across the front surface 14 of the case, for illuminating that front surface as evenly as possible both along its length and across its breadth. The illumination may simply comprise a light panel, to function as a light source, such as a torch, or may be with a view to illuminating decorative graphics. For the latter, a transparency 150 having the decorative graphics printed or otherwise applied to it is inserted in front of the diffuser 40 underlying the main window 18.

A pocket is thus created between the inside back of the front side 14 of the shell 12 and the diffuser 40 so that the transparent graphic 150 can be inserted and remain secured in front of the illuminated side of the diffuser 40, between the diffuser 40 and the front side 14. This will allow the illuminated side of the diffuser 40 to emit light 200 to shine through the graphic 150 and the main window 18.

The transfers 150, which are the interchangeable graphic panels, enable customization of the case. The transfer print process, which is called Lambder, is a unique process where the graphics are printed at a high resolution onto a clear plastic called a Duratran, Fujitran or a Duraflex amongst other vinyl. The contrast of the print is very high, which essentially allows for a solid black and/or a completely clear white (amongst all other colours) to be printed on the one sheet 150.

The interchangeable graphics 150 slide into the pocket in the case. There may be a slot at the top end of the pocket which helps to guide the graphic panel 150 in place.

The graphic panel 150 may include a die-cut camera lens/flash hole (not shown) which, when the graphic panel 150 is fully inserted, is in registration with the camera lens/flash 101, 102 as well as the corresponding secondary window 20 in the front side of the shell 12.

The dispersion of the light entering at essentially a point source on a first surface 41 of the diffuser to be emitted substantially uniformly across the opposite surface 43 can be achieved by a number of mechanisms.

Figure 19:
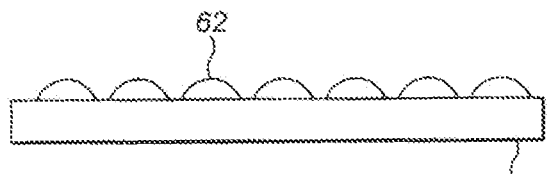
FIG. 19 shows a cross-section of a Prismex™ sheet.

A first factor is the material of the diffuser 40. In a preferred embodiment, the plat panel of the diffuser is formed of Perspex™ material, which may be clear or coloured. Light entering the diffuser 40 at a first (rear) surface 41 is transmitted through the diffuser to be emitted from the opposite front surface 43. Some light will be transmitted along and across the diffuser by total internal reflection and will be emitted from the front surface 43 remote from the location at which the light entered (e.g. at the flash 102). The chamfered edges 42 help to bounce the light internally to aid in even dispersion within and from the diffuser 40. Alternative materials include ACRLITE™ trueLED™, ACRLITE™ Radiant™, Prismex™ (as shown in FIG. 19, comprising a Prismex sheet 60 having a dot matrix pattern 62 on an upper surface) and fluorescent Perspex™.

The provision of an etched portion 44 allows light 200 to 'escape' from that portion in preference to flat, unetched portions. This phenomenon can be used to advantage, defining the area over which light is to be emitted by the etched portion. The etched portion 44 may be a simple rectangular shape, as illustrated, or may comprise a more complex design, to provide a visual effect from the diffuser alone, without the need for an additional graphic insert 150 (although the two could be used in conjunction).

Figure 10:
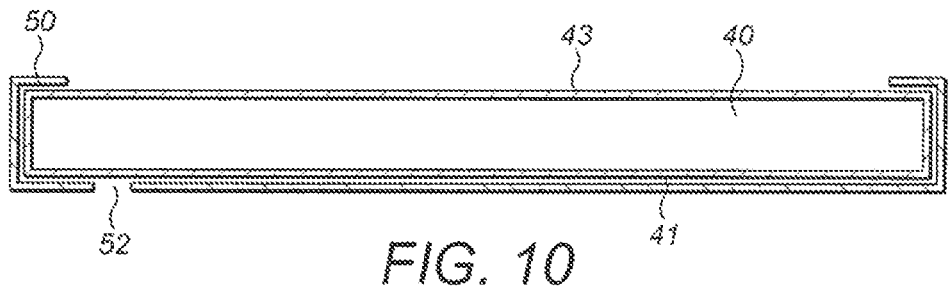
FIG. 10 is a schematic cross-section through an exemplary diffuser, having a reflective layer.
Figure 11:
FIG. 11 corresponds to FIG. 10, but has the reflective layer only disposed on the edges of the diffuser.

To assist in retaining light 200 within the diffuser 40 until the light paths have been sufficiently dispersed to emit an even and bright light from the front surface 43, the diffuser 40 may be at least partially surrounded by a reflective layer 50. As shown in FIG. 10, this reflective layer 50 may enclose all but a portion of the front surface 43 of the diffuser (from which portion the even and bright light will be emitted), and a hole 52 by the flash 102 to allow the light from the flash to be incident on the rear surface 41. In an alternative arrangement, as shown in FIG. 11, only the edges of the diffuser 42 may be covered by the reflective layer 50.

Figure 12:
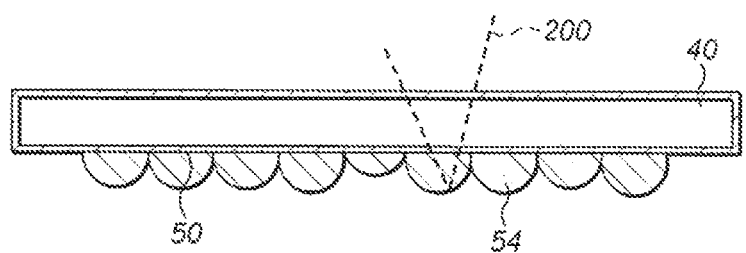
FIG. 12 illustrates an exemplary reflective layer, sprayed directly on to the diffuser.
Figure 13:
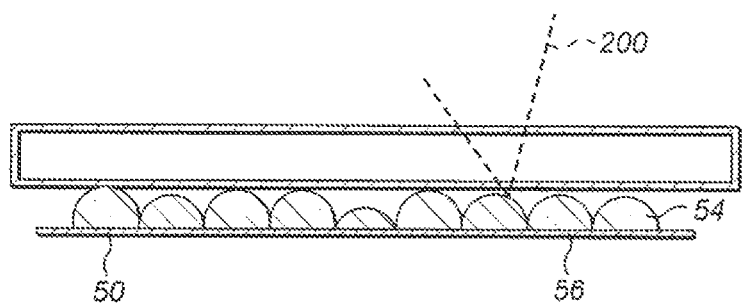
FIG. 13 illustrates an alternative reflective layer, in which reflective material is sprayed onto a separate substrate before application to the diffuser.
Figure 14:
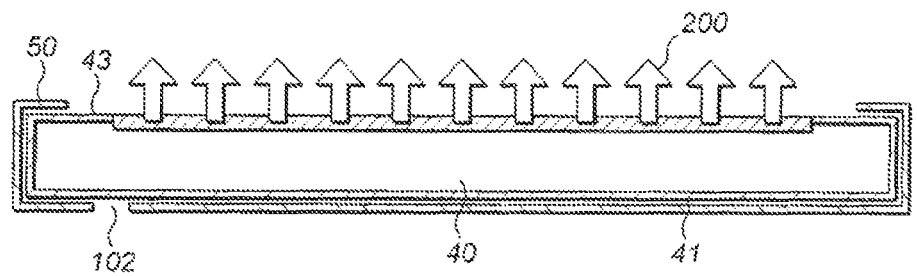
FIG. 14 corresponds to FIG. 10, but includes an etched surface on the diffuser from which light radiates.

The reflective layer 50 may comprise a reflective material such as, for example, reflective micro beads 54 sprayed directly on to the surface(s) of the diffuser 40, to provide uniform reflectivity and enhanced intensity of light via a reflective painted surface. See FIG. 12. Alternatively, the reflective layer 50 may comprise a thin substrate 56 onto which are sprayed reflective micro beads 54, the sprayed substrate then being applied to the diffuser.

Figure 20:
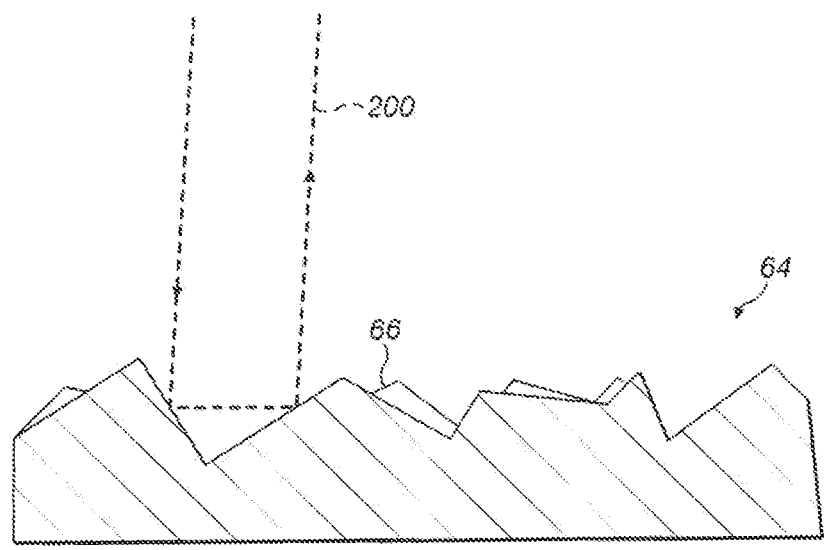
FIG. 20 shows a cross-section of a prismatic reflective surface.

Further alternative reflective materials include metallic foils, and prismatic reflective tapes 64 comprising microprisms 66 that reflect light 200, as shown in FIG. 20.

Figure 6:
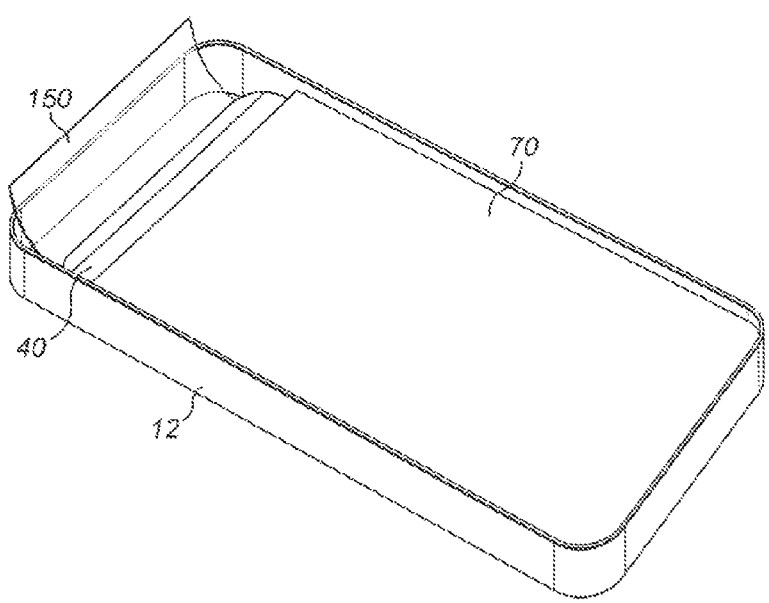
FIG. 6 corresponds to FIG. 5, but with the case fully assembled.
Figure 7:
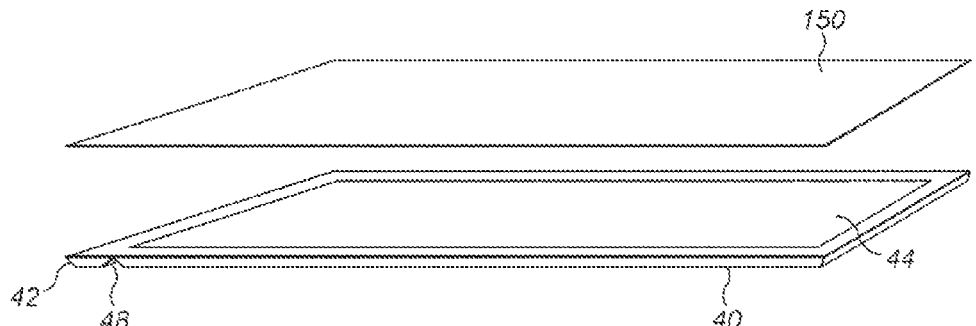
FIG. 7 is a schematic side view of an exemplary diffuser and an overlaid transparency insert.

Rather than being applied to the diffuser, the reflective layer 50 could be incorporated onto a separate element, such as panel 70 of FIGS. 5 and 6, which includes a reflective front surface for placement adjacent the rear surface 41 of the diffuser 40.

The provision of a reflective layer 50 will not only assist in generating a brighter and more uniform illumination from the flash light source 102, but will also provide an illuminative effect from reflecting ambient light, even when the flash 102 is off.

Figure 8A:
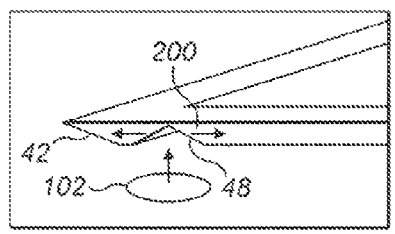
FIG. 8A is a detail view of an end portion of the diffuser of FIG. 8.
Figure 8B:
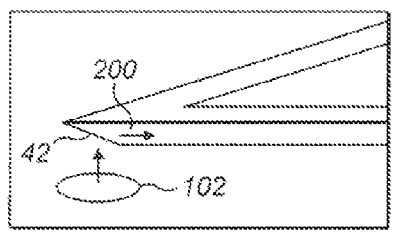
FIG. 8B corresponds to FIG. 8B, but shows an alternative implementation.
Figure 8:
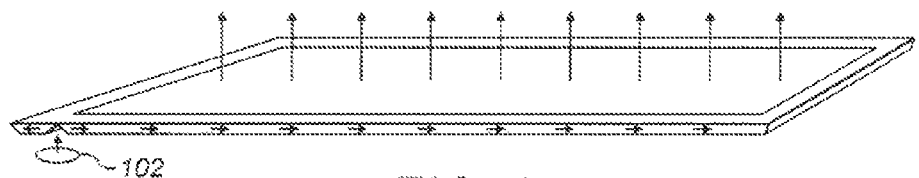
FIG. 8 is a schematic view of the diffusion of light within the diffuser of FIG. 7.

In order to aid in capture and re-direction of light from the flash 102, the diffuser 40 may be positioned above the flash 102 with a light re-directing feature in registration with the flash. In a first example, the light re-directing feature can be the chamfered top edge 42 of the diffuser, as shown in FIG. 8B. In another example, the light re-directing feature can be a groove 48 extending in line with the flash 102, as shown in FIG. 8A and FIG. 22A.

Figure 16:
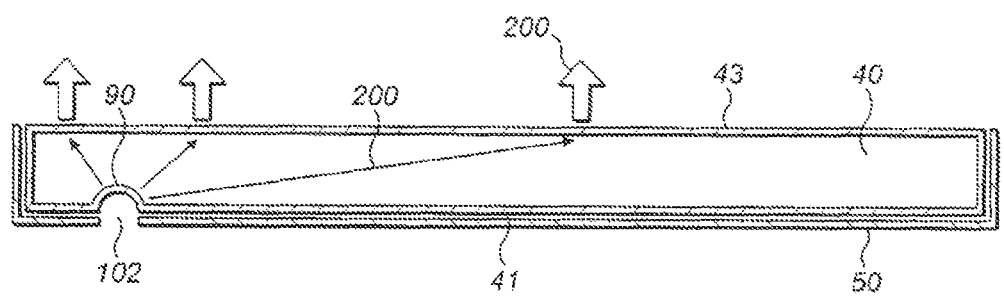
FIG. 16 illustrates a lens feature in the bottom surface of the diffuser, for re-directing light within the diffuser.
Figure 17:
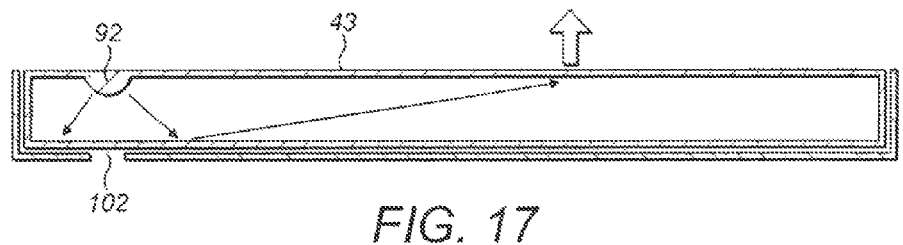
FIG. 17 corresponds to FIG. 16, but in which the lens feature is in the upper surface of the diffuser.
Figure 17A:
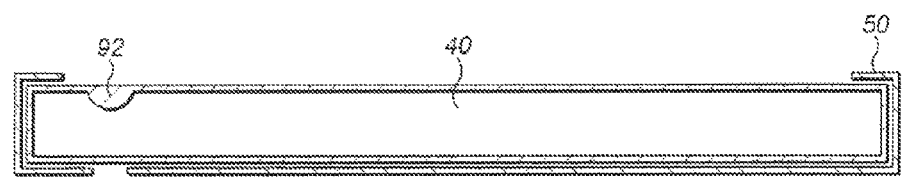
FIGS. 17A-C show alternative lens arrangements.
Figure 17B:
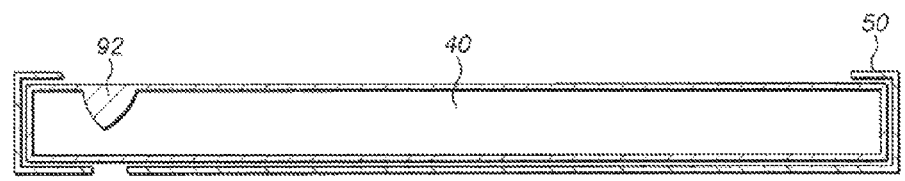
Figure 17C:
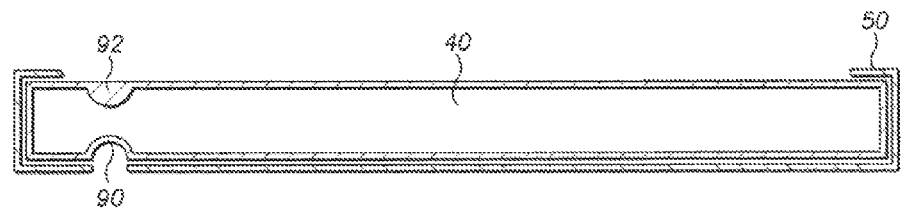
Figure 18A:
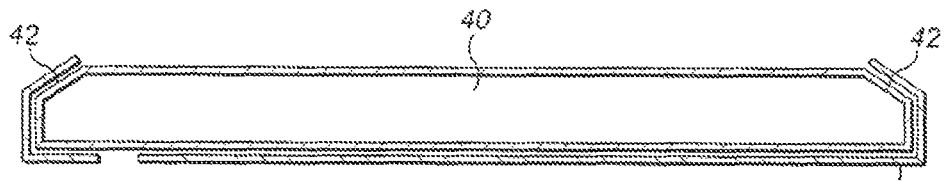
FIGS. 18 A-D show alternative cross-sectional shapes for the diffuser.
Figure 18B:
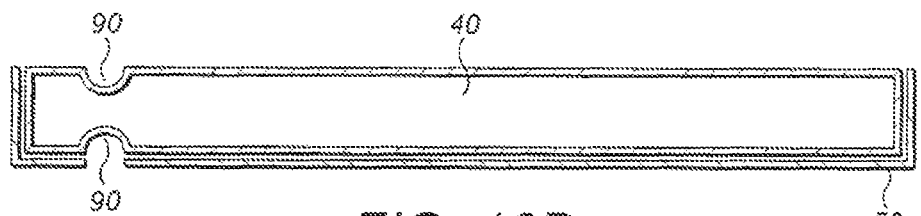
Figure 18C:
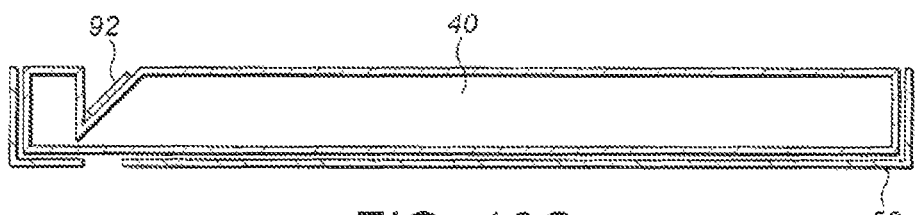
Figure 18D:
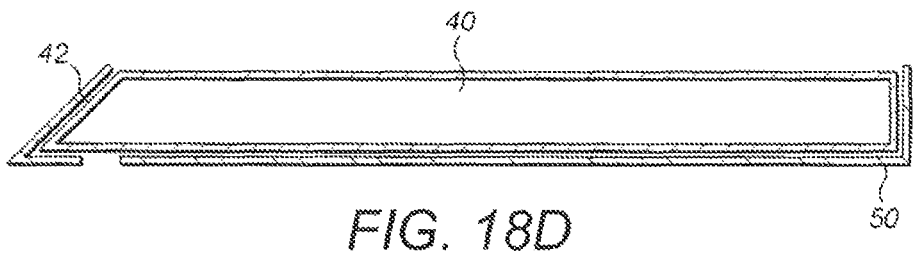

In addition or alternatively, one or more lens elements may be provided to aid in re-directing the incident light 200. In a first example, of FIG. 16, a concave indent 90 is cut into the first surface 41 of the diffuser 40 in registration with the flash 102. Light incident on the lens element 90 is thus re-directed internally in the diffuser for emission across a broader area of the front surface 43 than might otherwise be the case. An alternative lens element is shown in FIG. 17, in which a reflective lens element 92 is formed on the internal front surface 43 such that light 200 from the flash 102 is bounced off the reflective lens element 92 internally. FIGS. 17A-C show alternative shapes and combinations of lens features 90, 92 and reflective layers 50.

Further alternative arrangements of lens-like elements 90,92, chamfered edges 42 and reflective layers 50 are shown in FIGS. 18A-D.

In another embodiment, at least one of the edges 16 of the shell 12 includes an edge window (not shown) so that light can be emitted therethrough from the diffuser 40. For example, each of the longer edges 16 may include windows which may be open apertures through the shell material, or may include clear panels mounted to or integral with the edges 16. The edge window may be patterned so as to display an image, such as a logo, when illuminated. The patterning may be by virtue of the shape of the window itself or may be by the application of a separate image graphic to the window.

In such an embodiment, the diffuser 40 may be designed to include elements for enhancing the light emitted from the edges 42 of the diffuser in registration with the or each edge window. As an example, the long edges 42 of the diffuser may be cut to depend perpendicularly from the flat surface to receive light reflected internally in the main portion of the diffuser 40 and emit it from the panels and through the edge windows. Preferably, the perpendicularly depending edges would be polished to improve light emission.

An advantage of embodiments including this edge window feature is that light emitted from the case 10 would be visible even if the case were to be placed on a surface with the main window 18 face-down.

It should be understood that these combinations are not intended to be limiting and that the skilled person would recognise that many alternatives could be implemented with the objective of providing as bright and uniform illumination as possible across at least part of the diffuser 40, and through the or each window or edge window. In certain embodiments including an edge window, the main window 18 could be omitted.

In use, the flash 102 is triggered to illuminate the diffuser 40, thereby illuminating any graphics that may be present on the optional insert 150. Whereas the flash may be triggered manually, it would be preferably to have its operation controlled by suitable software, such as an app. The flash could then be triggered to light up in a defined sequence, or in time to the beat of music, for example.

Figure 21:
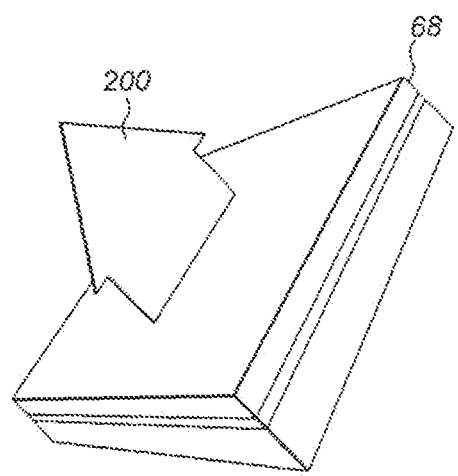
FIG. 21 illustrates a photonic lattice arrangement, such as used in PhlatLight™ technology.

FIG. 21 shows a photonic lattice arrangement 68, such as used in PhlatLight™ technology, which can be useful to create efficient, uniform, collimated light, particularly from an LED source. In a PhlatLight™ LED, the photonic lattice is an integral part of the LED construction; for the present invention, the photonic lattice can be a separate entity, mounted to the case—e.g. the diffuser 40—so as to be in registration with the light source 102 in the encased electronic device, to aid the redirection of the light 200 and enhance uniformity of illumination.

The concepts set out above in the context of a case for an iPhone™ would also work identically for the Apple iPad™, but the diffuser 40 would need to be larger. The case 10 would of course be larger. Likewise, the concept would also work when applied, with suitable amendments, to the Apple iPod™.

In other phone models, the underlying concepts and technology would be the same again, but the position of the flash will be different, as shown in FIG. 23. The case would have a different design, including a differently-positioned lens element to capture the light from the flash unit.

Figure 15:
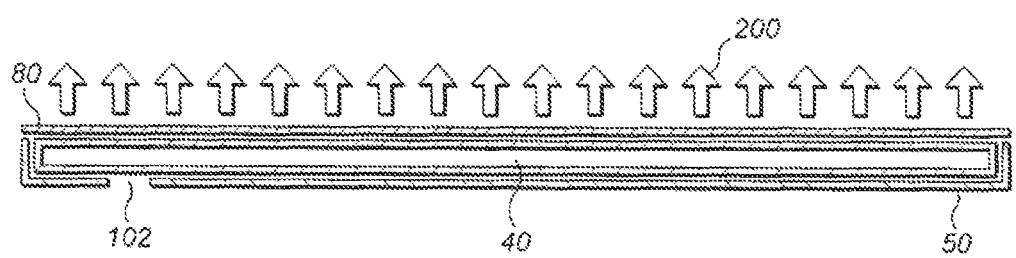
FIG. 15 substantially corresponds to FIG. 14, but shows a discrete diffuser layer applied on top of the diffuser.

Rather than an etched area 44 on the front surface 43 of the diffuser, a separate diffuser layer 80 may be applied above the front surface to perform the same function. This alternative is shown in FIG. 15.

Figure 9:
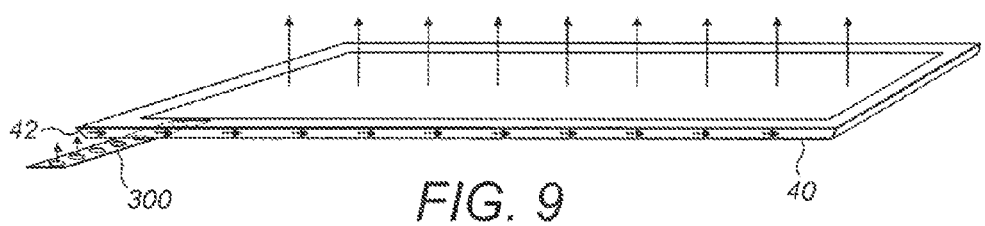
FIG. 9 corresponds to FIG. 8, but shows an alternative arrangement including a micro-LED array, for use with a portable electronic device without its own light source.

Instead of light 200 being supplied to the diffuser 40 by means of a light source, such as a flash, contained in the portable electronic device 100, the light source could be incorporated into the case 10. As an example and as shown in FIG. 9, the light source could be an active light source and comprise one or more strips of micro-LEDs 300 disposed below the diffuser 40, such as along at least top and bottom edges 42 thereof. The micro-LEDs could be powered by a power source integrated into the case. For example, the power source might comprise a battery or a solar panel mounted to the shell 12 of the case. This arrangement would be particularly useful for use with portable devices not having suitable light sources, or could be used to supplement the light emitted from the light source of the encased portable device.

In the above, the diffuser 40 has taken the form of a 'light box', taking light 200 incident on one part of the bottom surface 41 thereof, re-directing it internally, and emitting over a broader area on a second, opposite surface 43. In certain embodiments, however, the diffuser 40 can take a different form, omitting the 'light box' aspect and relying instead on passive reflection of light 200, which may simply be ambient light, incident on the front surface 43 of the diffuser, and through the reflective material properties of the diffuser, emitting the light back from at least a portion of the front surface with greater luminosity and intensity over that portion. Examples of such passive light sources include reflective painted surfaces and luminous painted surfaces. In one embodiment, the diffuser may comprise a surface that is covered with a reflective paint for reflecting light during the day, and with a luminous, 'glow-in-the-dark' paint for re-emitting absorbed light energy during the night.

The invention claimed is:

1. A case for a portable electronic device, the case comprising:
   a shell defining an interior volume dimensioned so as to snugly accommodate a particular portable electronic device, wherein at least a portion of the shell is translucent or transparent; and
   a diffuser, visible through said translucent or transparent portion of the shell and configured to diffuse light incident on a first surface of the diffuser for emission from a second surface of the diffuser facing the translucent or transparent portion,
   wherein the portable electronic device includes a camera flash;
   wherein the diffuser comprises a panel of light-transmissive material received in a cavity in the shell; and
   wherein the diffuser is slidable within the cavity between a position in which light emitted by the flash is incident on the first surface of the diffuser and a position in which the diffuser does not interfere with light from the flash.

2. The case of claim 1, wherein the first surface of the diffuser is opposite to the second surface and faces the interior volume.

3. The case of claim 1, comprising a reflective layer disposed on the first surface of the diffuser.

4. The case of claim 3, further comprising a reflective layer disposed around the sides of the diffuser.

5. The case of claim 1, wherein the diffuser includes an etched portion in its second surface.

6. The case of claim 1, wherein the diffuser includes at least one lens element, configured to re-direct light incident on the lens element within the diffuser.

7. The case of claim 6, wherein the lens element comprises an indent cut into the first surface of the diffuser.

8. The case of claim 6, wherein the lens element comprises a reflective prism internally disposed in the diffuser from the second surface.

9. The case of claim 1, wherein the lens element is positioned so as to be in registration with a light source on the portable electronic device when received in the interior volume.

10. The case of claim 1, wherein the shell includes a window through which a display on the portable electronic device is visible when received in the interior volume.

11. The case of claim 1, further comprising a pocket interposed between the diffuser and the transparent or translucent portion of the shell for receiving a transparent graphic.

12. The case of claim 11, wherein the pocket includes a slot at one end through which transparent graphics can be slid, so as to enable their interchange.

13. The case of claim 1, wherein at least the translucent or transparent portion of the shell is formed of clear polycarbonate.

14. The case of claim 13, wherein the sides of the shell are formed of rubber, bonded to the polycarbonate portion.

15. The case of claim 1, wherein the portable electronic device is a mobile telephone.

16. The case of claim 1, further comprising a light source mounted to the shell for emitting light incident on the first surface of the diffuser.

17. The case of claim 16, wherein said light source comprises one or more LEDs or micro-LEDs mounted directly to the interior of the shell.

18. The case of claim 1, wherein the diffuser includes a slider accessible through a slot in a side of the shell for sliding the diffuser between said positions.

19. The case of claim 1, wherein the diffuser is configured for sliding motion within the cavity, such that the diffuser is selectively positioned within the cavity in a selected one of a diffusing position in which light emitted by the flash is incident on the first surface of the diffuser and a noninterfering position in which the diffuser is spaced apart from the flash such that light emitted by the flash is substantially separated from the first surface of the diffuser.

* * * * *